(12) United States Patent
Gretz

(10) Patent No.: US 7,563,979 B1
(45) Date of Patent: Jul. 21, 2009

(54) PROTECTIVE CABLE CHUTE FOR DECORA COVER PLATE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 71 days.

(21) Appl. No.: 12/011,162

(22) Filed: Jan. 24, 2008

(51) Int. Cl.
*H02G 3/14* (2006.01)

(52) U.S. Cl. .............................. 174/66; 174/67; 174/53; 220/241

(58) Field of Classification Search .................. 174/66, 174/67, 53, 58, 63, 64; 220/241, 242; 439/76.1, 439/135, 131, 144; 631/119; D8/350–353; 248/56
See application file for complete search history.

(56) References Cited

U.S. PATENT DOCUMENTS

| | | | |
|---|---|---|---|
| 4,688,747 A | 8/1987 | Helmsdorfer et al. | |
| 6,064,003 A | 5/2000 | Moore et al. | |
| 6,211,465 B1 | 4/2001 | Streit | |
| 6,840,483 B1 | 1/2005 | Dickens | |
| D503,156 S | 3/2005 | Provenzano | |
| 7,141,744 B2 | 11/2006 | Cloutier | |
| 7,271,339 B2 * | 9/2007 | Dinh ........................... | 174/66 |
| D554,475 S | 11/2007 | Gorin et al. | |
| 7,390,964 B2 * | 6/2008 | Gorin et al. ................... | 174/66 |
| 7,399,920 B2 * | 7/2008 | Gorin et al. ................... | 174/66 |

* cited by examiner

*Primary Examiner*—Dhiru R Patel (57) ABSTRACT

A protective cable chute for routing low voltage cables through walls. The protective cable chute includes a protective cable shield and a standard decora cover plate. The protective cable shield includes two ears with apertures therein for mounting directly to a convention single gang electrical box or conventional low voltage frame. Threaded bores are provided in the ears of the protective cable shield for receipt of fasteners for mounting a standard decora plate thereto. An opening and passageway in the protective cable shield are capable of receiving low voltage cables for the purpose of routing them through the wall and into an adjacent room. An alternative embodiment of the protective cable chute is provided for use with a two-gang electrical box or conventional two-gang low voltage frame.

10 Claims, 11 Drawing Sheets

PROTECTIVE CABLE CHUTE FOR DECORA COVER PLATE

FIELD OF THE INVENTION

This invention relates to the installation of low voltage wiring in buildings and specifically to a protective cable chute for routing low voltage electrical or communications cables through interior walls.

BACKGROUND OF THE INVENTION

A wide variety of low voltage components such as telephone cables, coax cables for television and internet service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

In some cases, holes are simply made in the baseboard or walls and low voltage cables are simply routed through the holes. However, this is an unsightly solution and detracts from the overall appearance of the building. One prior art device for routing low voltage components is that of U.S. Pat. No. 4,688,747 to Helmsdorfer, et al., issued on Aug. 25, 1987, which includes a wall aperture molding with a removable plate cover. The plate cover clips to the molding plate with the plate cover extending downwardly and outwardly from the molding plate to define a cable passage between the lower edge of the plate cover and the molding plate. The molding plate may be further provided with a gate slot to provide installation over pre-existing cables.

However, one disadvantage with prior art wall aperture moldings such as that described above is that they are not complementary with wall openings prepared for conventional electrical devices. Therefore, in order to install the prior art molding plate, a hole must be made specifically sized for the molding plate. A further disadvantage with the aperture molding described above is that it is limited to one orientation with respect to the molding plate.

What is needed therefore is a device that is complementary to conventional electrical boxes and conventional low voltage frames and that can be attached thereto for the purposes of routing low voltage cables through walls.

SUMMARY OF THE INVENTION

The invention is a protective cable chute for routing low voltage cables through walls. The protective cable chute includes a protective cable shield and a standard decora cover plate. The protective cable shield includes two ears with apertures therein for mounting directly to a convention single gang electrical box or conventional low voltage frame. Threaded bores are provided in the ears of the protective cable shield for receipt of fasteners for mounting a standard decora plate thereto. An opening and passageway in the protective cable shield are capable of receiving low voltage cables for the purpose of routing them through the wall and into an adjacent room. An alternative embodiment of the protective cable chute is provided for use with a two-gang electrical box or two-gang low voltage frame.

OBJECTS AND ADVANTAGES

Several advantages are achieved with the protective cable chute of the present invention, including:

(1) The protective cable chute provides a device for routing low voltage wires and cables through walls.
(2) The protective cable chute can be used with a conventional single or conventional double gang electrical box or low voltage frame for providing cable passageways through walls.
(3) The protective cable chute for single gang boxes accommodates standard decora cover plates.
(4) As a result of being compatible with conventional electrical boxes or low voltage frames and conventional decora cover plates, the protective cable chute for a single gang electrical box does not require the manufacture of a specially designed cover plate.
(5) Several configurations are available to the installer to provide several options for an attractive installation. The protective cable chute can be mounted with the cable shield extending outward or inward and with the nose portion opening oriented upward or downward, thereby allowing selection of one of four possible mounting installations for added flexibility in routing cables through walls.
(6) By using the protective cable chute of the present invention, the installer may be able to utilize existing installed electrical boxes and low voltage frames for routing low voltage cables and thereby avoid creating additional holes in the walls.

These and other objects and advantages of the present invention will be better understood by reading the following description along with reference to the drawings.

INDEX TO REFERENCE NUMERALS IN DRAWINGS

| | |
|---|---|
| 20 | protective cable chute |
| 22 | cable shield |
| 24 | decora plate |
| 26 | base portion of cable shield |
| 28 | ends of base portion |
| 30 | ear |
| 32 | threaded bore in ear |
| 34 | aperture in ear |
| 36 | nose portion |
| 38 | sidewall |
| 40 | top wall |
| 42 | outer wall |
| 44 | lower edge of outer wall |
| 46 | lower edge of sidewall |
| 48 | nose portion opening in cable shield |
| 50 | inner cavity or cable passageway |
| 51 | planar base of cover plate |
| 52 | second opening |
| 53 | cover opening |
| 54 | apertures in cover plate |
| 55 | electrical box |
| 56 | fastener |
| 58 | threaded bore in electrical box |
| 60 | fastener |
| 62 | wall of building |
| 64 | outer wall surface |
| 66 | inner wall surface |
| 68 | low voltage cable |
| 70 | protective cable chute, second embodiment |
| 72 | two-gang electrical box |
| 74 | two-gang cable shield |
| 75 | nose portion |
| 76 | cover plate |
| 78 | opening in cover plate |
| 80 | fastener |
| 82 | aperture in two-gang cable shield |
| 84 | threaded bore in electrical box |
| 86 | fastener |
| 87 | aperture in cover |
| 88 | threaded bore in two-gang cable shield |
| 90 | ear |
| 92 | opening in cover plate |
| 94 | first side of cable shield |
| 96 | second side of cable shield |
| 98 | first end of cable shield |
| 100 | second end of cable shield |
| 102 | perimeter wall |
| 108 | threaded bore in two-gang cable shield |

DETAILED DESCRIPTION OF THE INVENTION

Figure 1:
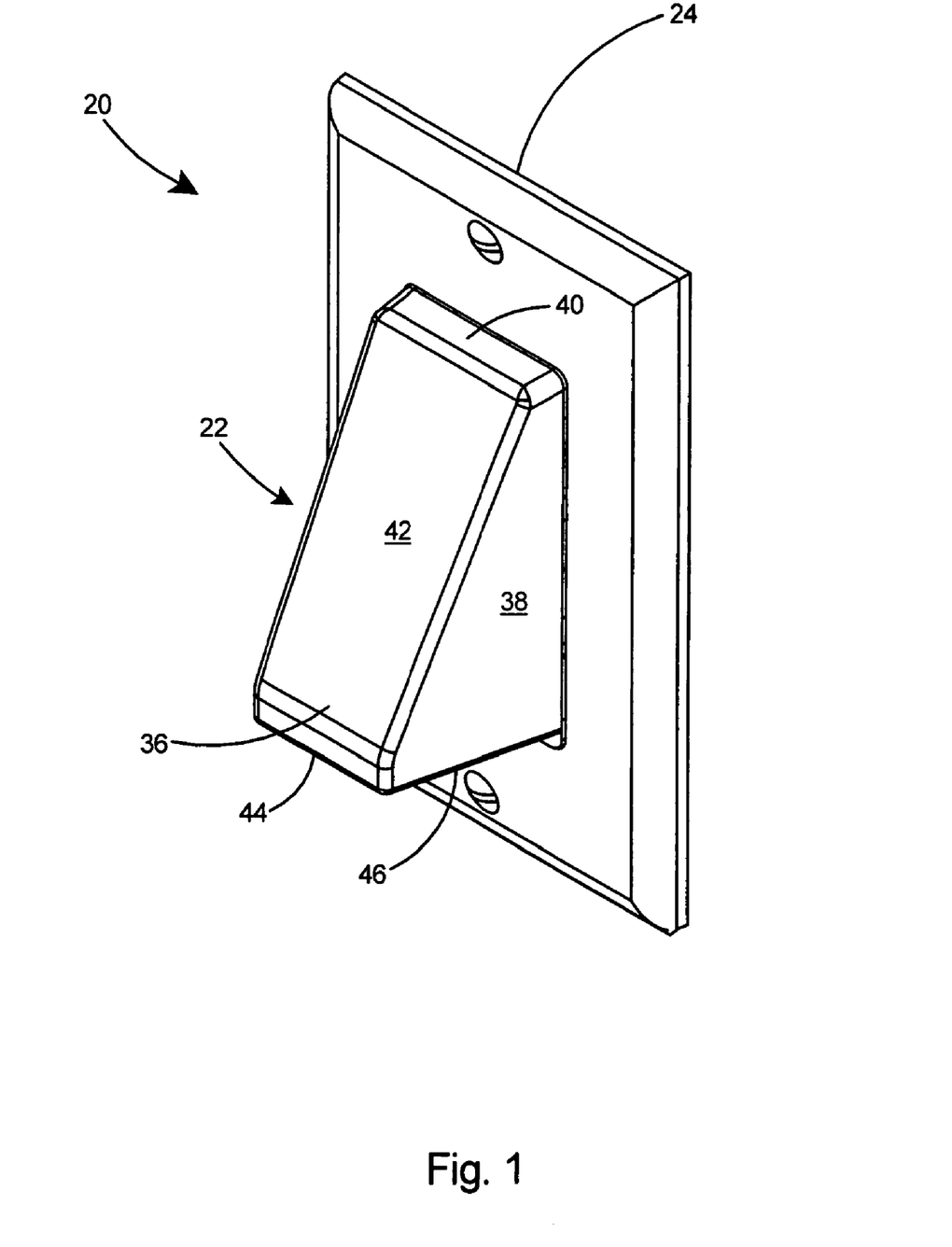
FIG. 1 is a perspective view of an especially preferred embodiment of a protective cable chute according to the present invention.

Referring to FIG. 1 there is shown a preferred embodiment of the present invention, a protective cable chute 20. The protective cable chute 20 includes a protective cable shield 22 and a standard decora plate 24.

Figure 2:
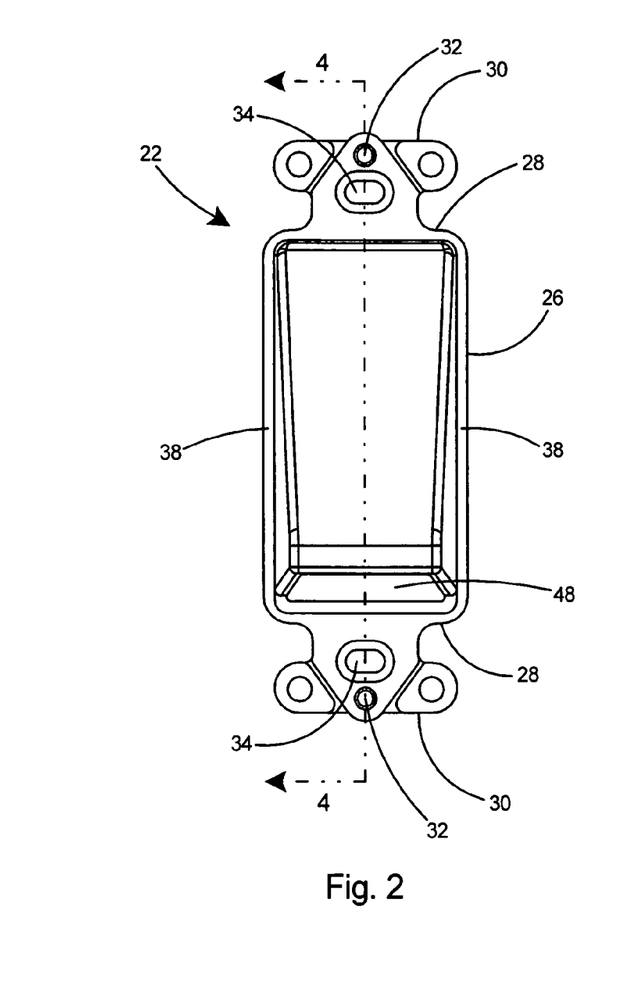
FIG. 2 is a rear view of a protective cable shield that forms a portion of the protective cable chute of FIG. 1.
Figure 3:
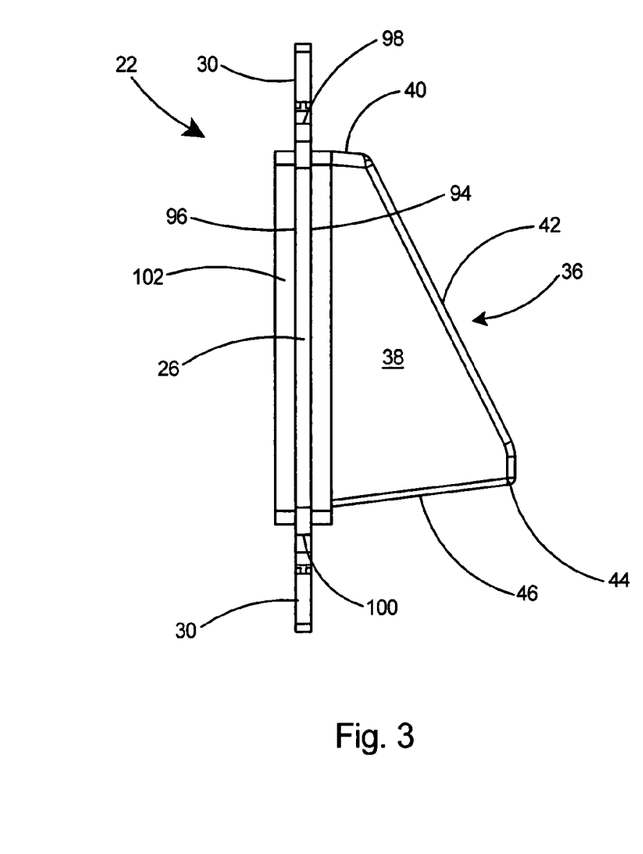
FIG. 3 is a side view of the protective cable shield of FIG. 2.

As shown in FIGS. 2 and 3, the protective cable shield 22 includes a base portion 26 having ends 28 thereon, two ears 30 extending from the ends 28 of the base portion 26. Threaded bores 32 and apertures 34 are provided in the ears 30. The cable shield 22 further includes a nose portion 36 including sidewalls 38, a top wall 40, and an outer wall 42. A lower edge 44 is provided on the outer wall 42 and a lower edge 46 is provided at the lower end of the sidewalls 38. A substantially rectangular-shaped nose portion opening 48 is formed by the lower edges 44 and 46 of the outer wall 42 and sidewalls 38 respectively.

Figure 4:
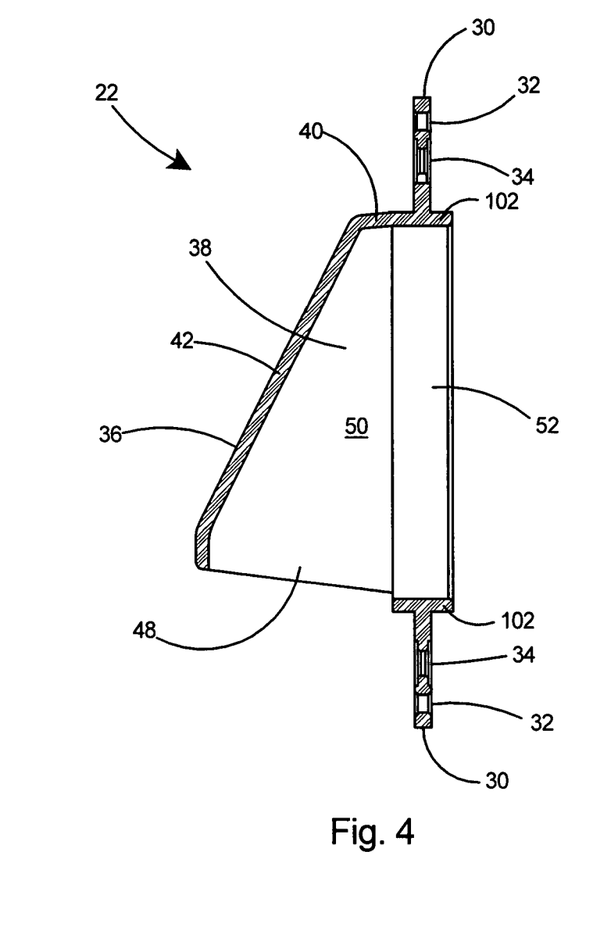
FIG. 4 is a sectional view of the protective cable shield taken along line 4-4 of FIG. 2.
Figure 5:
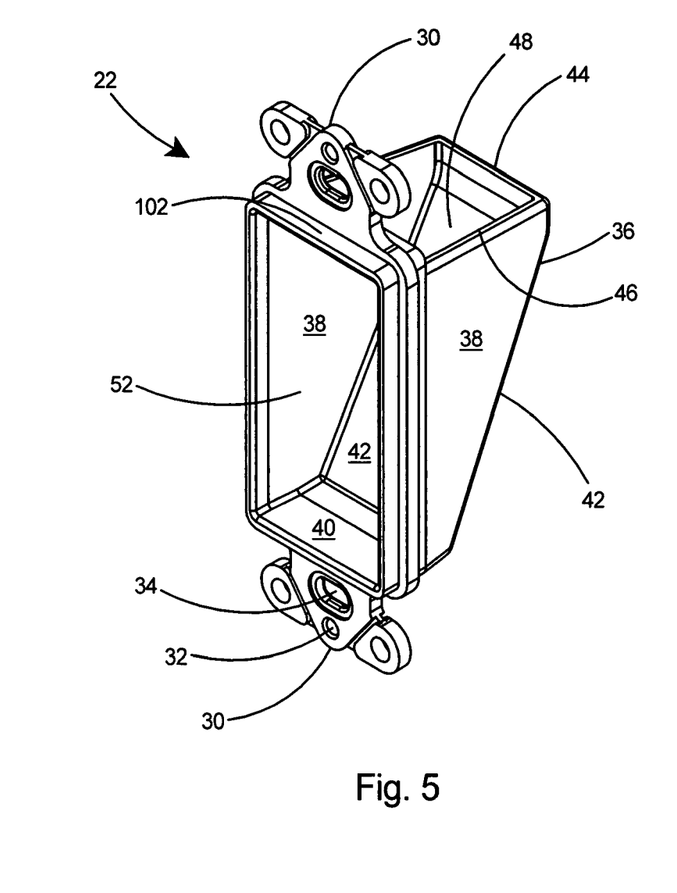
FIG. 5 is a rear perspective view of the protective cable shield of FIG. 2.

With reference to FIGS. 4 and 5, the sidewalls 38, top wall 40, and outer wall 42 form an inner cavity or cable passageway 50 therein extending from the nose portion opening 48 to a substantially rectangular-shaped second opening 52. The protective cable shield 22 is preferably molded in one piece of plastic but could also be formed of metal.

Figure 6:
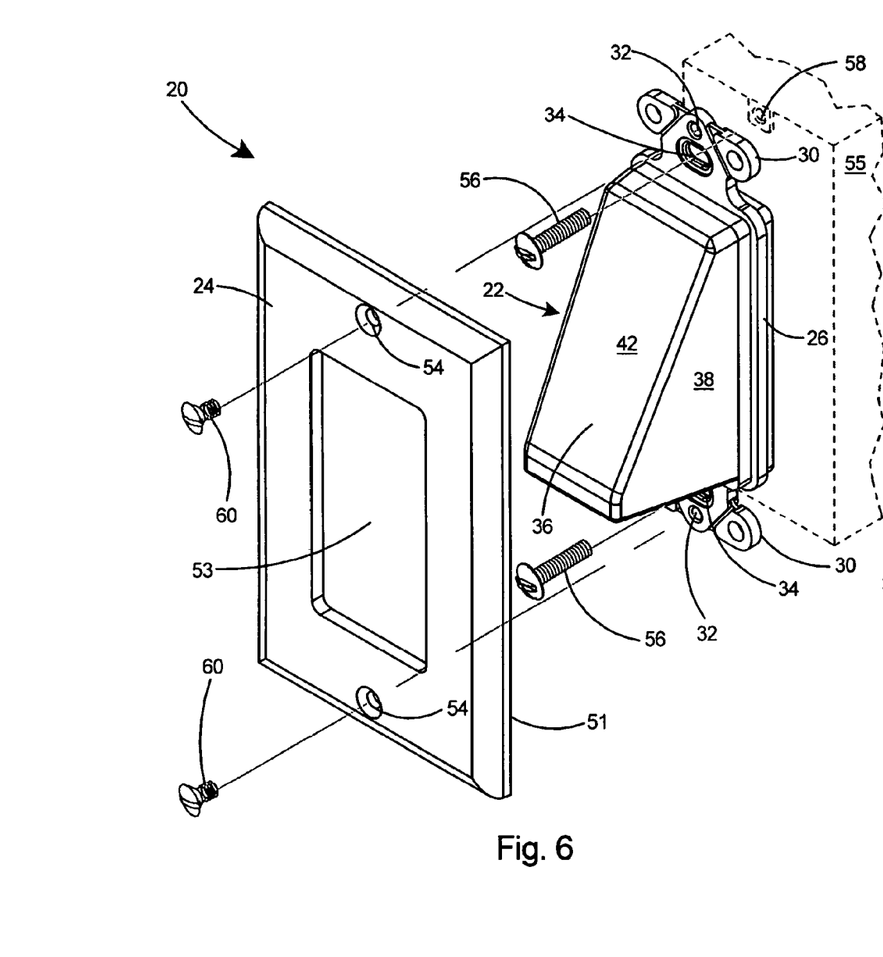
FIG. 6 is an exploded perspective view of the protective cable chute of FIG. 1.
Figure 7:
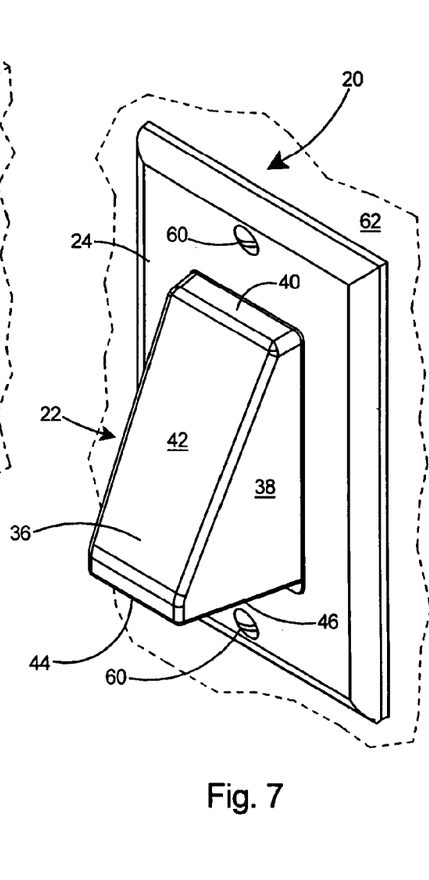
FIG. 7 is a perspective view of the protective cable chute of FIG. 6 after being installed on a wall.

Referring to FIG. 6 there is shown the protective cable chute 20 of the present invention with the various portions in alignment to be joined together including a standard decora cover plate 24 in alignment with the protective cable shield 22. The decora cover plate 24 includes a substantially planar base 51, a cover opening 53, and apertures 54 therein. The protective cable shield 22 is shown in alignment with a conventional electrical box 55 to which it will be secured by fasteners 56 through apertures 34 into threaded bores 58 in the electrical box 55. Although the protective cable chute 20 of the present invention is shown in alignment to be connected to an electrical box 55 it should understood that the protective cable chute 20 can also be secured to a low voltage frame (not shown) in the same manner as described herein for an electrical box 55. After the cable shield 22 is secured to the electrical box 55, the decora cover plate 24 is secured to the cable shield 22 by fasteners 60 threaded into the threaded bores 32 in the ears 30 of the cable shield 22. The completed installation of the protective cable chute 20 on a building wall 62 is shown in FIG. 7.

Figure 8:
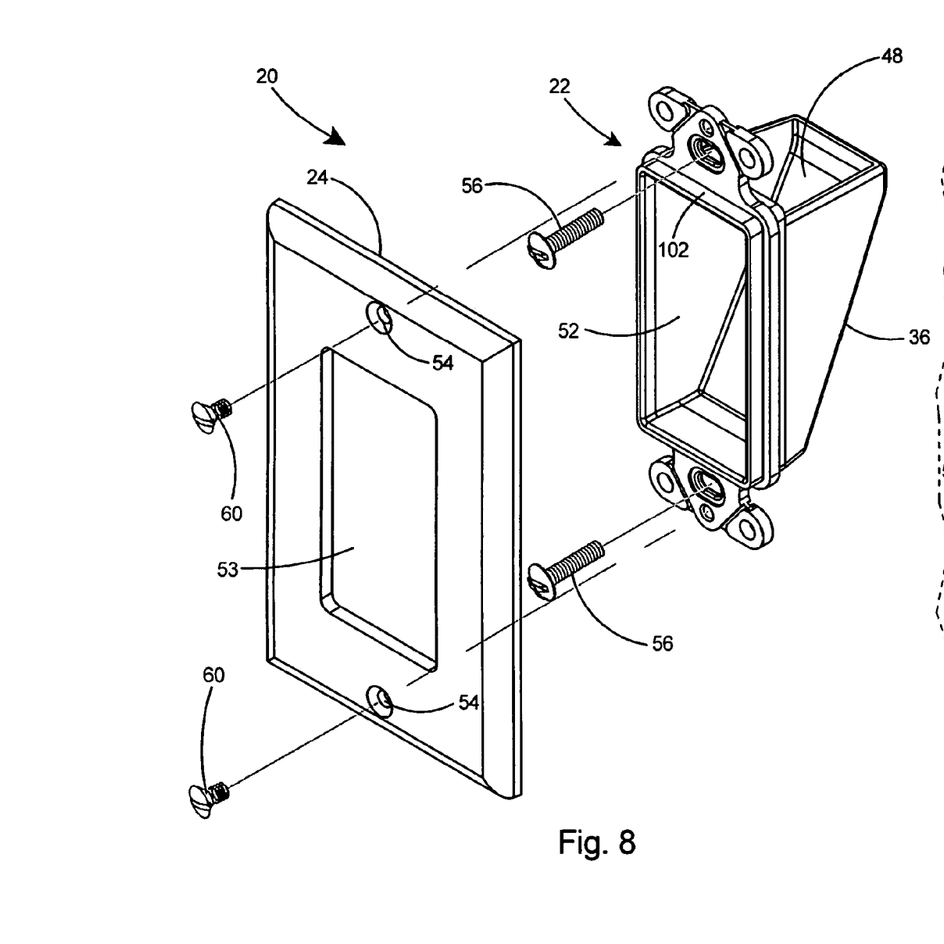
FIG. 8 is an exploded perspective view of the protective cable chute in a second orientation.
Figure 9:
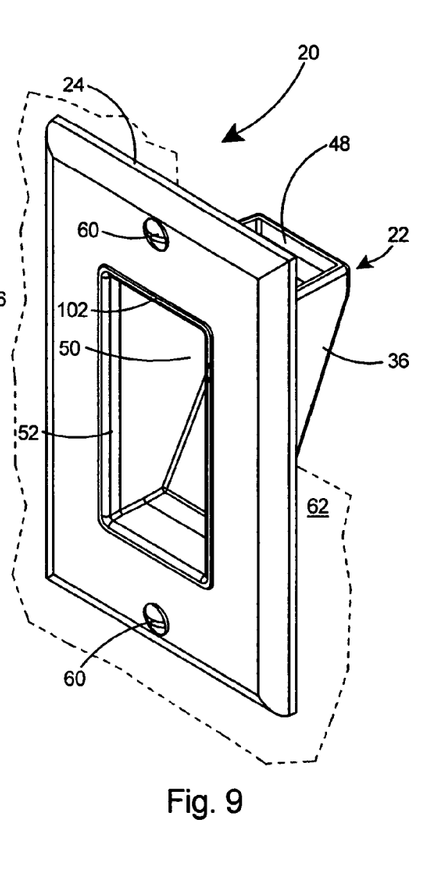
FIG. 9 is a perspective view of the protective cable chute of FIG. 8 after being installed on a wall.

The protective cable chute 20 of the present invention may be installed with the nose portion 36 extending outward, as shown in FIG. 6, or inward as depicted in FIGS. 8 and 9. Multiple orientations or configurations of the cable shield 22 with respect to the decora cover plate 24 are possible. These various configurations offer the installer several options in creating a passageway for low voltage cables through walls.

Figure 10:
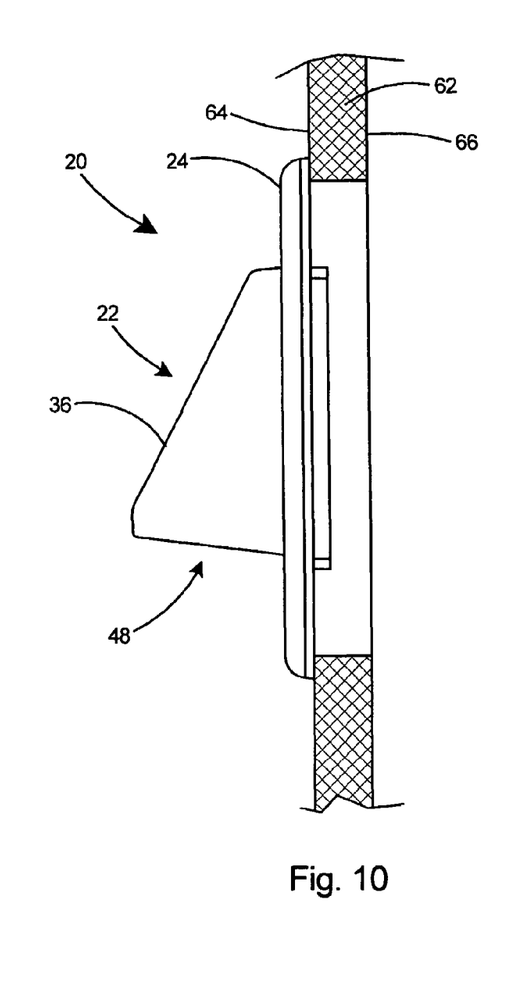
FIG. 10 is a side view of the protective cable chute of the present invention secured to a wall in a first orientation with the cable chute oriented outward and down.
Figure 11:
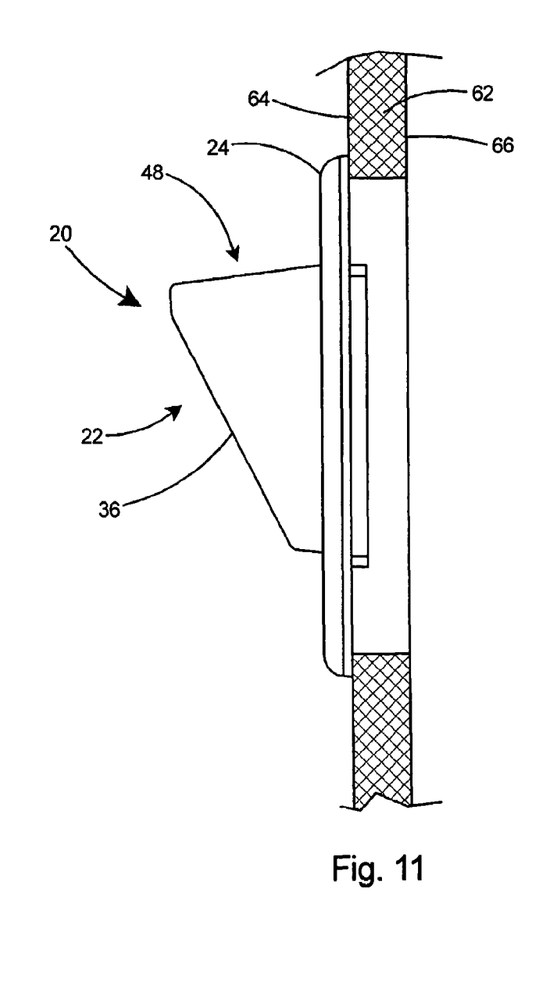
FIG. 11 is a side view of the protective cable chute of the present invention secured to a wall in a second orientation with the cable chute oriented outward and up.
Figure 12:
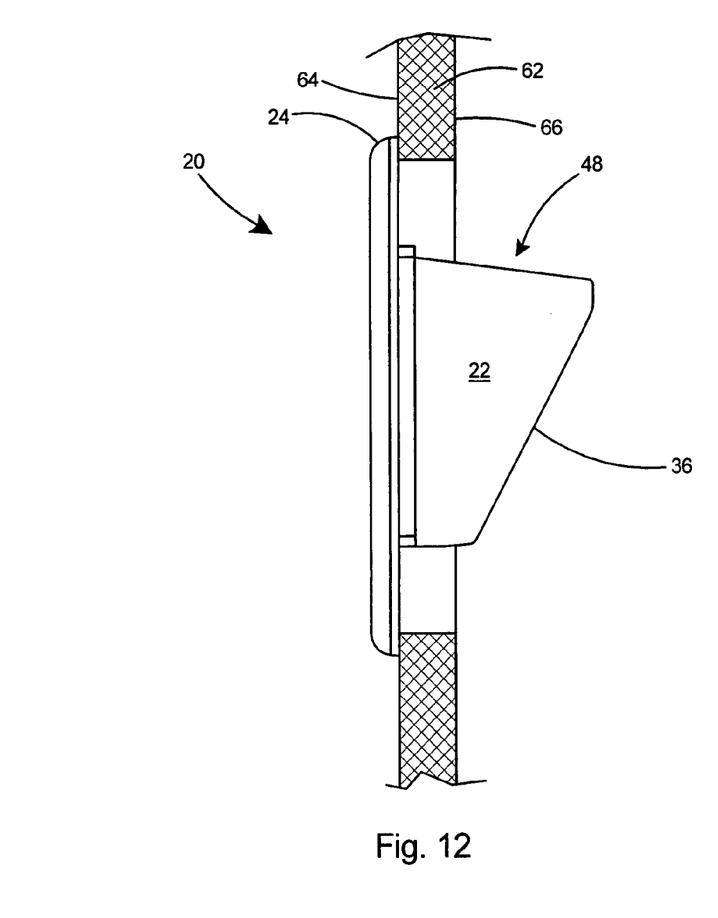
FIG. 12 is a side view of the protective cable chute of the present invention secured to a wall in a first orientation with the cable chute oriented inward and up.
Figure 13:
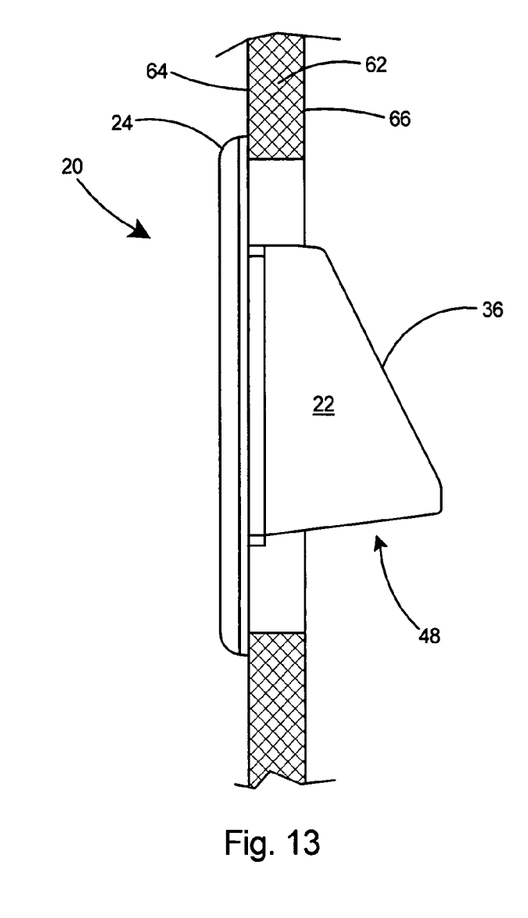
FIG. 13 is a side view of the protective cable chute of the present invention secured to a wall in a first orientation with the cable chute oriented inward and down.

With reference to FIGS. 10-13 there are shown four separate configurations that are available to the installer depending on his desires or the specific requirements at the job site. The building wall 62 is depicted with an outer wall surface 64 and an inner wall surface 66. FIG. 10 depicts the protective cable chute 20 in a first configuration with the nose portion 36 extending outward of the outer wall surface 64 and with the nose portion opening 48 of the cable shield 22 down. FIG. 11 depicts the protective cable chute 20 in a second configuration with the nose portion 36 extending outward and the nose portion opening 48 up. The protective cable chute 20 in FIG. 12 is depicted in a third configuration with the nose portion 36 extending inward of the wall 62 and the nose portion opening 48 facing upward. FIG. 13 depicts a fourth configuration of the protective cable chute 20 with the nose portion 36 extending inward of the wall 62 and the nose portion opening 48 oriented downward. Any of the four configurations is selectable by the installer at the job site.

Figure 14:
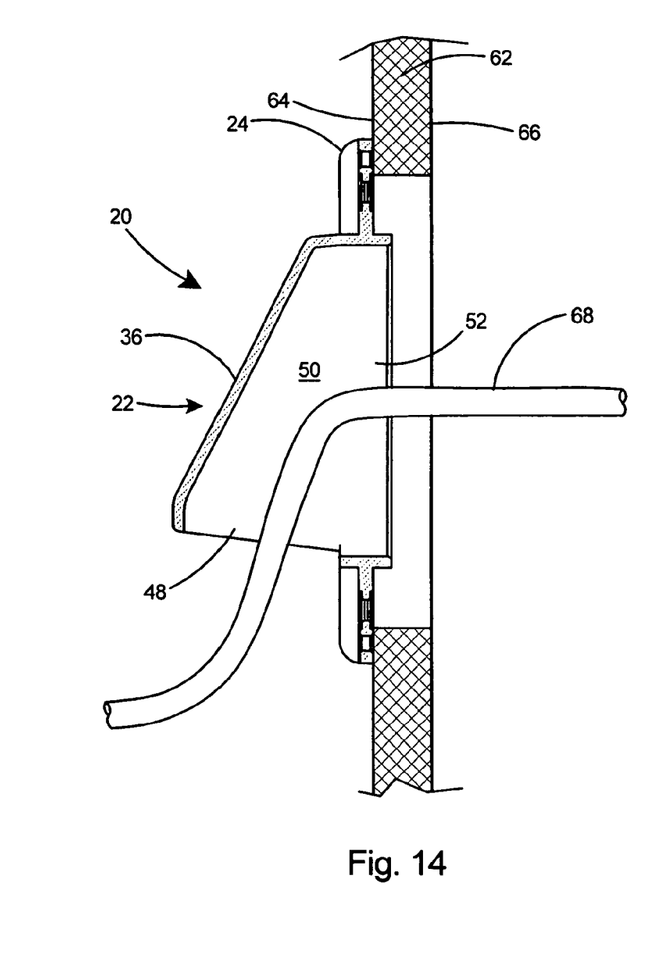
FIG. 14 is a sectional view of the protective cable chute of the present invention secured to a wall with the cable chute oriented outward and down and depicting a low voltage cable routed through the cable chute.

With reference to FIG. 14 there is shown a protective cable chute 20 according to the present invention installed in a configuration with the nose portion 36 extending outward of the wall 62 and the nose portion opening 48 oriented downward. A low voltage cable 68 is shown extending into nose portion opening 48, through the inner cavity or passageway 50, and out the second opening 52. In the configuration depicted in FIG. 14, nose portion opening 48 becomes the outer opening that oriented toward the room and opening 52 becomes the inner opening that is located behind the cable shield 22 or toward the wall 62.

Figure 15:
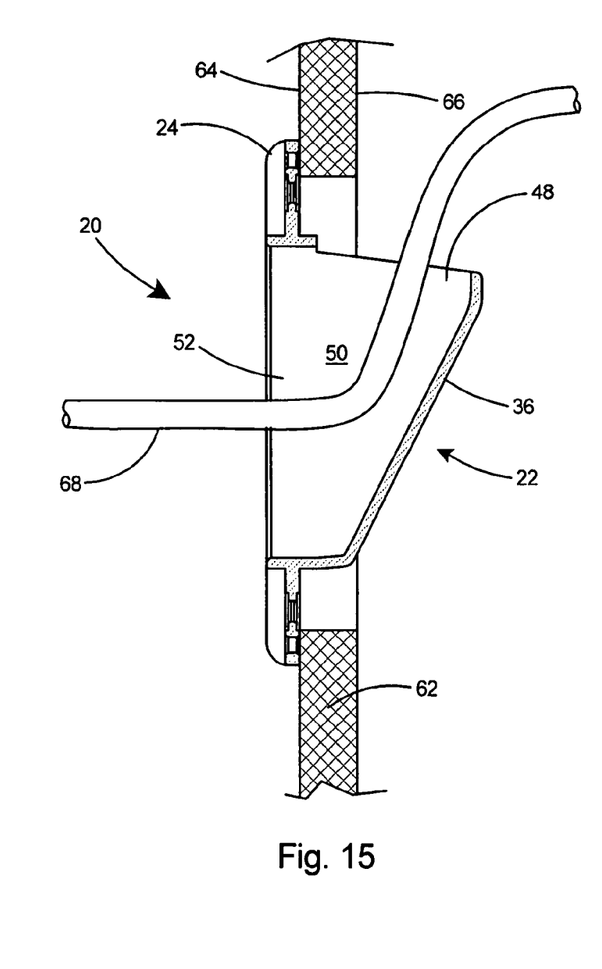
FIG. 15 is a sectional view of the protective cable chute of the present invention secured to a wall with the cable chute oriented inward and up and depicting a low voltage cable routed through the cable chute.

With reference to FIG. 15 there is shown a protective cable chute 20 according to the present invention installed in a configuration with the nose portion 36 extending inward of the wall 62 and the nose portion opening 48 oriented upward. A low voltage cable 68 is shown extending into second opening 52, through the inner cavity or passageway 50, and out nose portion opening 48. In the configuration depicted in FIG. 15, second opening 52 becomes the outer opening that oriented toward the room and nose portion opening 48 becomes the inner opening that is located behind the cable shield 22 or behind the wall 62.

Figure 16:
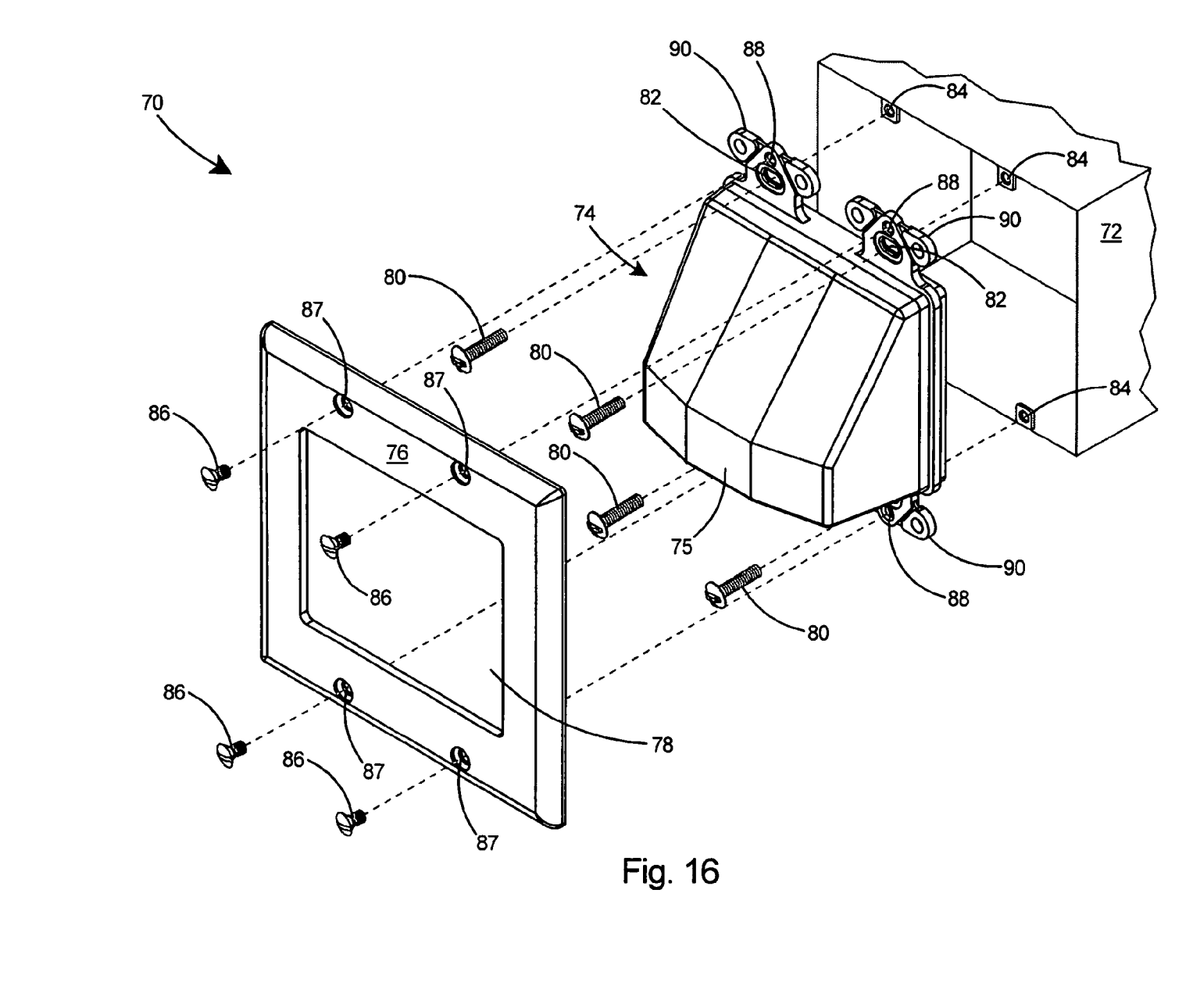
FIG. 16 is an exploded perspective view of a second embodiment of the protective cable chute for use with a two-gang electrical box.

Referring to FIG. 16 there is depicted a second embodiment of the protective cable chute 70 according to the present invention. Protective cable chute 70 is for use with a conventional two-gang electrical box 72 or two-gang low voltage box or bracket (not shown). In alignment with the two-gang electrical box 72 to be secured thereto in a first configuration is a two-gang cable shield 74 with an extending nose portion 75 and a cover plate 76 according to the present invention. The cover plate 76 includes an opening 78 therein to accommodate the two-gang cable shield 74. The protective two-gang cable shield 74 is shown in alignment with the conventional two-gang electrical box 72 to which it will be secured by fasteners 80 through apertures 82 in cable shield 74 into threaded bores 84 in the electrical box 72. After the two-gang cable shield 74 is secured to the two-gang electrical box 72, the cover plate 76 is secured to the cable shield 74 by fasteners 86 threaded through apertures 87 in cover plate 76 into the threaded bores 88 in the ears 90 of the two-gang cable shield 74. The two-gang cable shield 74 is depicted in FIG. 16 in a first configuration, with the nose portion 75 of the cable shield 74 oriented outward of the cover plate 76 and the opening (not shown) of the cable shield 74 oriented downward. In a manner analogous to the first embodiment described above, the two-gang cable shield 74 can be installed in any of four configurations, with the possible configurations including the nose portion 75 of the two-gang cable shield out and the opening down, as in FIG. 16, with the nose portion out and the opening up, with the nose portion of the two-gang cable shield in and the opening down, or with the nose portion in and the opening up.

Figure 17:
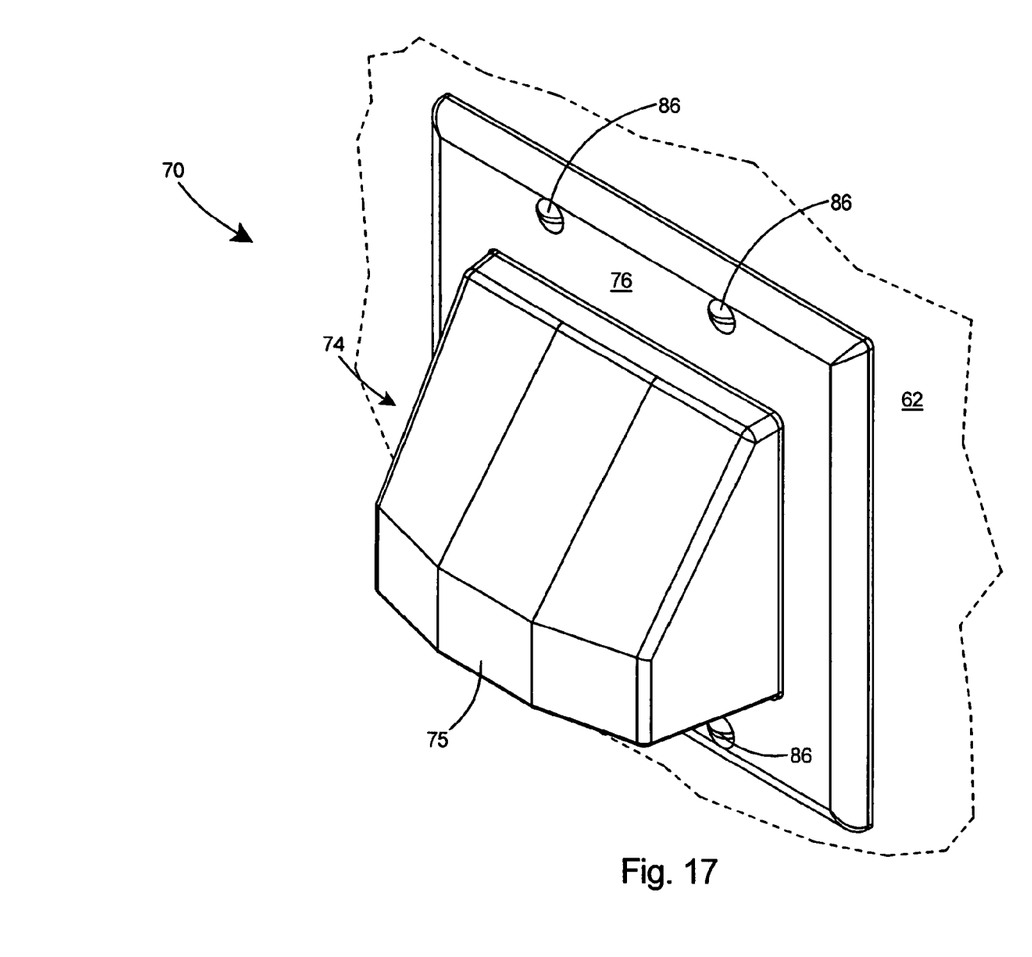
FIG. 17 is a perspective view of the second embodiment of the protective cable chute installed on a wall in a first configuration, with the cable shield oriented outward and the cable shield opening down.
Figure 18:
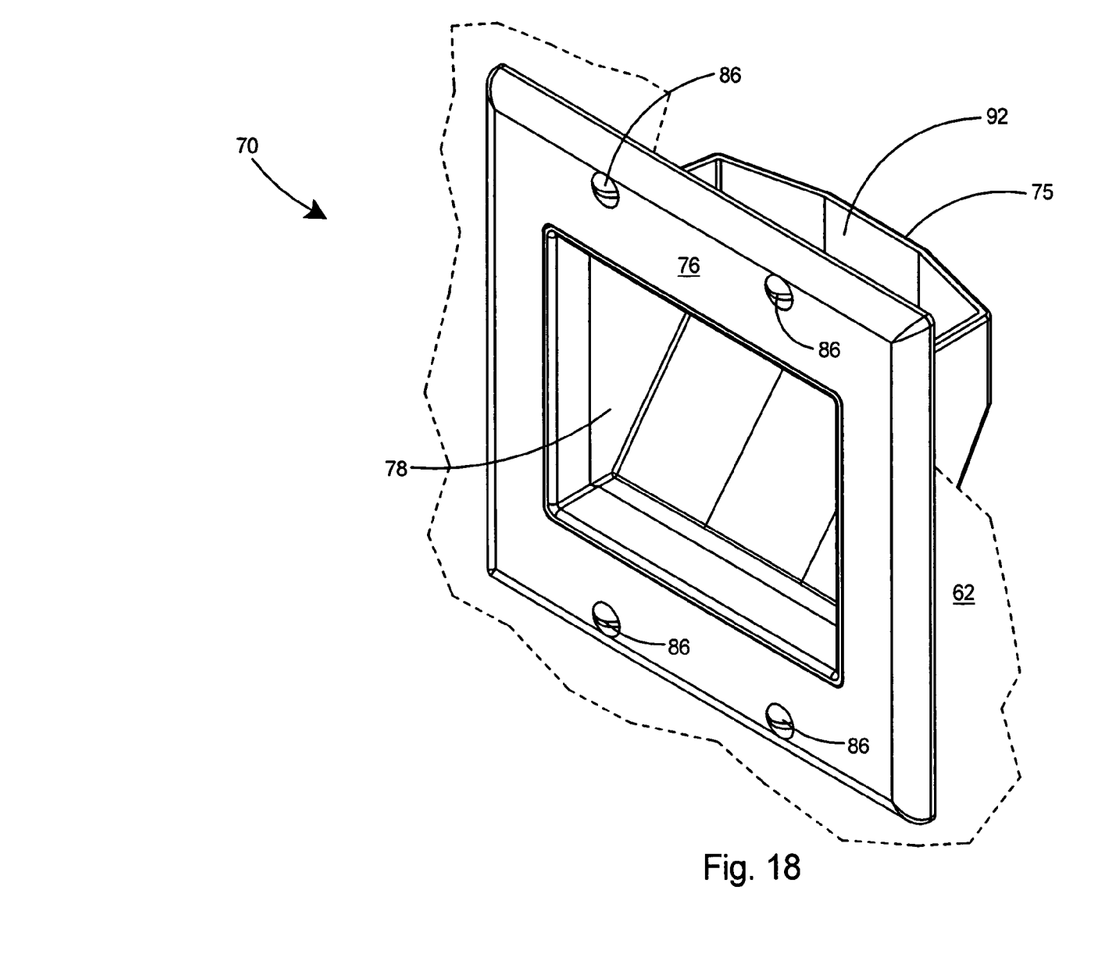
FIG. 18 is a perspective view of the second embodiment of the protective cable chute installed on a wall in a second configuration, with the cable shield oriented inward and the cable shield opening up.

The completed installation of the second embodiment of the second embodiment of the protective cable chute 70 for a two-gang electrical box or two-gang low voltage box on a building wall 62 is shown in FIG. 17. The installed two-gang cable shield 74 is the completed installation of the configuration depicted in FIG. 16. A second potential configuration of the two-gang protective cable chute 70 is depicted in FIG. 18, wherein the configuration includes the two-gang cable shield 74 extending from the back side of the cover plate 76 and the opening 92 oriented upward. In this configuration, the two-gang cable shield 74 is mounted behind the wall 62.

With reference to FIGS. 2 and 3, the base portion 26 of the cable shield 22 further includes a first side 94 and a second side 96 with the nose portion 36 extending from the first side 94. The nose portion 36 also includes a first end 98 and a second end 100. Thus, the protective cable chute of the present invention may be secured to the electrical box in any of several configurations (as shown in FIGS. 10-13) including the nose portion 36 oriented toward (see FIGS. 12 and 13) or away from (see FIGS. 10 and 11) the electrical box and the nose portion opening 48 oriented up (see FIGS. 11 and 12) or down (see FIGS. 10 and 13) with respect to the wall. The cable shield 22 further includes a perimeter wall 102 extending from the second side 96 of the base portion 26. As shown in FIGS. 8 and 9, when the nose portion 36 of the cable shield 22 is oriented away from the cover plate 24 or toward the wall 62, the perimeter wall 102 nests within the cover opening 53 when it is fitted thereto.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A protective cable chute comprising:
   a cable shield including a base portion for connection to a front opening of an electrical box;
   a cover plate including a planar base, at least one cover opening therein;
   said base portion of said cable shield including a first side and second side and a first end and a second end;
   ears extending from said ends of said base portion, said ears including apertures therein for receipt of fasteners for securing said cable shield to the electrical box;
   a nose portion on said cable shield extending outward from said first side of said base portion and including a nose portion opening therein;
   said cable shield capable of being secured to said electrical box in a first configuration wherein said nose portion extends toward said electrical box;
   said cable shield capable of being secured to said electrical box in a second configuration wherein said nose portion extends away from said electrical box;
   said cover plate secured to said cable shield with said nose portion of said cable shield in alignment with said opening of said cover plate and said cover plate covering said front opening of said electrical box.

2. The protective cable chute of claim 1 including
   threaded bores in said ears of said cable shield;
   apertures in said cover plate; and
   said cover plate is secured to said cable shield by fasteners secured through said apertures in said cover plate into said threaded bores in said ears of said cable shield.

3. The protective cable chute of claim 1 wherein
   said nose portion includes sidewalls and an outer wall extending between said sidewalls;
   said sidewalls include a lower edge;
   said outer wall includes a lower edge; and
   said lower edge of said sidewalls and said lower edge of said outer wall define said nose portion opening.

4. The protective cable chute of claim 3 wherein said cable shield includes an internal cavity defined by said sidewalls and said outer wall of said nose portion.

5. The protective cable chute of claim 4 wherein said cable shield includes a second opening at said second side of said nose portion.

6. The protective cable chute of claim 5 wherein said nose portion opening, said internal cavity, and said second opening of said cable shield comprise a cable passageway for the routing of electrical cables there through.

7. The protective cable chute of claim 1 wherein said cover opening is substantially rectangular-shaped.

8. The protective cable chute of claim 1 wherein said nose portion opening is substantially rectangular-shaped.

9. The protective cable chute of claim 1 wherein
said second side of said base portion of said cable shield includes a perimeter wall; and
said perimeter wall nests within said cover opening when fitted thereto and said nose portion is oriented toward said electrical box.

10. The protective cable chute of claim 1 wherein said electrical box is a two-gang electrical box.

* * * * *

(12) EX PARTE REEXAMINATION CERTIFICATE (7693rd)
United States Patent
Gretz (10) Number: US 7,563,979 C1
(45) Certificate Issued: Aug. 17, 2010

(54) PROTECTIVE CABLE CHUTE FOR DECORA COVER PLATE (75) Inventor: Thomas J. Gretz, Clarks Summit, PA (US)

(73) Assignee: Arlington Industries, Inc., Scranton, PA (US)

Reexamination Request:
No. 90/010,708, Sep. 23, 2009

Reexamination Certificate for:
Patent No.: 7,563,979
Issued: Jul. 21, 2009
Appl. No.: 12/011,162
Filed: Jan. 24, 2008

(51) Int. Cl.
*H02G 3/14* (2006.01)

(52) U.S. Cl. .................. 174/66; 174/67; 174/53; 220/241

(58) Field of Classification Search .................. None
See application file for complete search history.

(56) References Cited

U.S. PATENT DOCUMENTS

| | | |
|---|---|---|
| D269,429 S | 6/1983 | Doyle et al. |
| 4,688,747 A | 8/1987 | Helmsforfer et al. |
| 6,064,003 A | 5/2000 | Moore et al. |
| 6,211,465 B1 | 4/2001 | Streit |
| 6,793,524 B2 | 9/2004 | Clark et al. |
| 6,840,483 B1 | 1/2005 | Dickens |
| D503,156 S | 3/2005 | Provenzano |
| 6,909,060 B1 | 6/2005 | Shotey et al. |
| 7,141,744 B2 | 11/2006 | Cloutier |
| 7,271,339 B2 | 9/2007 | Dinh |
| D554,475 S | 11/2007 | Gorin et al. |
| 7,390,964 B2 | 6/2008 | Gorin et al. |
| 7,399,920 B2 | 7/2008 | Gorin et al. |
| 2008/0110886 A1 | 5/2008 | Provenzano et al. |

*Primary Examiner*—Minh T Nguyen (57) ABSTRACT

A protective cable chute for routing low voltage cables through walls. The protective cable chute includes a protective cable shield and a standard decora cover plate. The protective cable shield includes two ears with apertures therein for mounting directly to a convention single gang electrical box or conventional low voltage frame. Threaded bores are provided in the ears of the protective cable shield for receipt of fasteners for mounting a standard decora plate thereto. An opening and passageway in the protective cable shield are capable of receiving low voltage cables for the purpose of routing them through the wall and into an adjacent room. An alternative embodiment of the protective cable chute is provided for use with a two-gang electrical box or conventional two-gang low voltage frame.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 5 and 7-9 are cancelled.

Claim 1 is determined to be patentable as amended.

Claims 2, 4, 6 and 10, dependent on an amended claim, are determined to be patentable.

1. A protective cable chute comprising:
a *one-piece* cable shield including a base portion for connection *directly* to a front opening of an electrical box, *said base portion extending around the entire periphery of said cable shield*;
a *standard* cover plate including a planar base[, at least one] *and a rectangular shaped* cover opening therein;
said base portion of said cable shield including a first side and second side and a first end and a second end;
ears extending from said ends of said base portion *of said cable shield*, said ears including apertures therein for receipt of fasteners for securing said cable shield *directly* to the electrical box;
a nose portion on said cable shield extending outward from said first side of said base portion and including a nose portion opening therein;
*said nose portion includes planar sidewalls and an outer wall extending between said sidewalls, said sidewalls include a lower edge, said outer wall includes a lower edge, and said lower edge of said sidewalls and said lower edge of said outer wall define said nose portion opening;*
*said cable shield includes a rectangular shaped second opening at said second side of said base portion;*
said cable shield capable of being secured to said electrical box in a first configuration wherein said nose portion extends toward said electrical box;
said cable shield capable of being secured to said electrical box in a second configuration wherein said nose portion extends away from said electrical box;
said cover plate secured to said cable shield with said nose portion of said cable shield in alignment with said opening of said cover plate and said plate covering said front opening of said electrical box;
*said second side of said base portion of said cable shield includes a perimeter wall extending transversely from said base portion; and*
*said perimeter wall nesting within the entire periphery of said cover opening when fitted thereto and said nose portion is oriented toward said electrical box.*

\* \* \* \* \*